United States Patent [19]

Bettin et al.

[11] 4,263,537
[45] Apr. 21, 1981

[54] CONTROLLED POSITIONING OF A MOTOR SHAFT

[75] Inventors: Hubertus Bettin, Braunschweig; Rainer Bornemann, Meinersen, both of Fed. Rep. of Germany

[73] Assignee: Olympia Werke AG, Wilhelmshaven, Fed. Rep. of Germany

[21] Appl. No.: 118,789

[22] Filed: Feb. 5, 1980

[30] Foreign Application Priority Data

Feb. 5, 1979 [DE] Fed. Rep. of Germany ....... 2904275

[51] Int. Cl.³ .............................................. G05B 13/00
[52] U.S. Cl. ..................................... 318/561; 318/616
[58] Field of Search ................ 318/561, 616, 617, 618

[56] References Cited
U.S. PATENT DOCUMENTS

| | | | |
|---|---|---|---|
| 3,412,300 | 11/1968 | Westenskow | 318/561 |
| 3,660,744 | 5/1972 | Plummer | 318/616 |
| 3,729,668 | 4/1973 | Brette | 318/617 X |
| 3,914,677 | 10/1975 | MacWade | 318/561 |

Primary Examiner—Benjamin Dobeck
Attorney, Agent, or Firm—Spencer & Kaye

[57] ABSTRACT

A method for positioning the shaft of a motor which can be subject to a rotation force in either direction of rotation by application of drive current of a respective polarity, in order to bring the shaft to a target angular position by the action of a digital control and a position sensor associated with the motor shaft for emitting a displacement step signal in response to each movement of the the shaft through an incremental angle constituting a given fraction of one cycle of shaft rotation, which includes giving the displacement step signal the form of a signal cycle of sinus-like waveform in response to each incremental angle of shaft movement, deriving from the displacement step signal a shaft movement signal having a value represented by the sum of a component proportional to the displacement step signal and a component proportional to the time derivative thereof, and, after the motor shaft has reached a defined angular speed and at the moment when the shaft position is spaced from the target position by one-half of the incremental angle, initiating a control signal having a value which decreases with time, comparing the shaft movement signal with the control signal, and varying the polarity of motor drive current in dependence on the polarity of the comparison result.

17 Claims, 8 Drawing Figures

CONTROLLED POSITIONING OF A MOTOR SHAFT

BACKGROUND OF THE INVENTION

The present invention relates to the controlled guidance of a d.c. motor into a target, or destination, position through the use of a digital control and a position sensor associated with the motor shaft for emitting a displacement step signal in response to each movement of the shaft through an incremental angle constituting a given fraction of one cycle of shaft rotation, by comparing a signal derived from such step signal with a control signal and utilizing the result of the comparison to control the motor drive current.

Various methods and circuit arrangements for bringing a motor into the vicinity of a target position by braking are already known. However, in order to bring the motor to the target position with high accuracy, special measures must be taken during the last phases of movement. Such measures are, for example, to let the motor travel to the target position, after braking, in a creeping movement or to adjust the braking delay so that it approaches a given curve.

In the first case, the speed selected for the creeping movement must be very low so that when the step instruction is finally given at the target position there will be no overshoot. Since, moreover, the creeping movement must start early enough so as to be independent of differences in load and friction, it takes a relatively long time for the motor to reach the target position. In the second case, a large amount of circuitry is required, particularly because digital signals must be converted to analog signals, to make it possible to approach the inherent analog delay characteristics.

A solution of the latter type is disclosed in German Offenlegungsschrift [Laid-open Application] No. 2,264,323 in which a clock pulse is derived from uniformly spaced path markers and is then used to obtain the analog value representing the remaining portion of the path. From this it is determined whether the ratio of actual speed to remaining path during braking has a given value with linear reduction in speed. Deviations are corrected by braking, idling or acceleration.

This method employs relatively complicated means to obtain analog values from digital circuit elements and signals and is dependent, inter alia, on the accuracy of constant current sources. Since, moreover, it is able to provide only a linear delay characteristic, the speed of the motor does not gradually die down as the target position is reached and the motor experiences overshooting or at least a sudden stop.

SUMMARY OF THE INVENTION

It is an object of the present invention to provide a method and circuit arrangement with which a d.c. motor can be brought into the target position quickly and reliably.

This and other objects are achieved, according to the present invention, in a method for positioning the shaft of a motor which can be subject to a rotation force in either direction of rotation by application of drive current of a respective polarity, in order to bring the shaft to a target angular position by the action of a digital control and a position sensor associated with the motor shaft for emitting a displacement step signal in response to each movement of of the shaft through an incremental angle constituting a given fraction of one cycle of shaft rotation, which method includes comparing a signal derived from such step signal with a control signal and utilizing the result of the comparison to control the motor drive current, by giving the displacement step signal produced by the sensor in response to each incremental angle of shaft movement the form of a signal cycle of sinus-like waveform; by performing, when the motor shaft reaches a predetermined angular speed and a position within the incremental angle from the target position, the steps of deriving from the displacement step signal a shaft movement signal having a value represented by the sum of a component proportional to the displacement step signal and a component proportional to the time derivative thereof for the last half of the associated step signal cycle, and giving the control signal a value which decreases with time; by causing the comparing step to include comparing the shaft movement signal with the control signal; and causing the step of utilizing the comparison result to include varying the polarity of motor drive current in dependence on the polarity of the comparison result.

The advantages of the invention are, in particular, that the d.c. motor reaches the intended target position quickly and enters into and stops in the target position in a gentle, or gradual manner. Additionally, the invention can be practiced without complicated circuit measures, such as for example digital/analog conversions. Moreover, it has the advantage of purely digital controllability which is of significance particularly when used in machines which are controlled by microprocessors.

The objects according to the invention are further achieved by the provision of a circuit for controlling the position of the shaft of a motor which can be subject to a rotation force in either direction of rotation by application of drive current of a respective polarity, by bringing the shaft to a target angular, which circuit includes: a position sensor responsive to rotation of the motor shaft for producing a displacement step signal in the form of a cycle of sinus-like waveform in response to each movement of the shaft through an incremental angle constituting a given fraction of one cycle of shaft rotation; control means connected to receive the signal produced by the sensor for monitoring the path traversed by, and the angular speed of, the motor shaft; a control switch connected between the motor and the control means to operate under control of the control means for controlling the delivery of drive current to the motor; a signal shaping member connected to the sensor for providing a shaft movement signal formed by the sum of a component proportional to the displacement step signal and a component proportional to the time derivative thereof; a control signal generator connected to the control means for providing, in response to signals from the control means, a control signal having a value which decreases with time; comparison means connected to receive the shaft movement signal and the control signal for producing a comparison signal dependent on the polarity of the difference between the two signals which it receives; and means for initiating the control signal and supplying the resulting comparison signal from the comparison means to the control switch for controlling the polarity of drive current applied to the motor as a function of the comparison signal when the motor shaft reaches a predetermined angular speed and an angular position within the incremental angle from the target position.

The advantage of this circuit arrangement can be seen, in particular, in that it only requires purely digital circuit elements and a small amount of circuitry. Its simple configuration assures low susceptibility to malfunction and errors.

DESCRIPTION OF THE PREFERRED EMBODIMENTS

Figure 1:
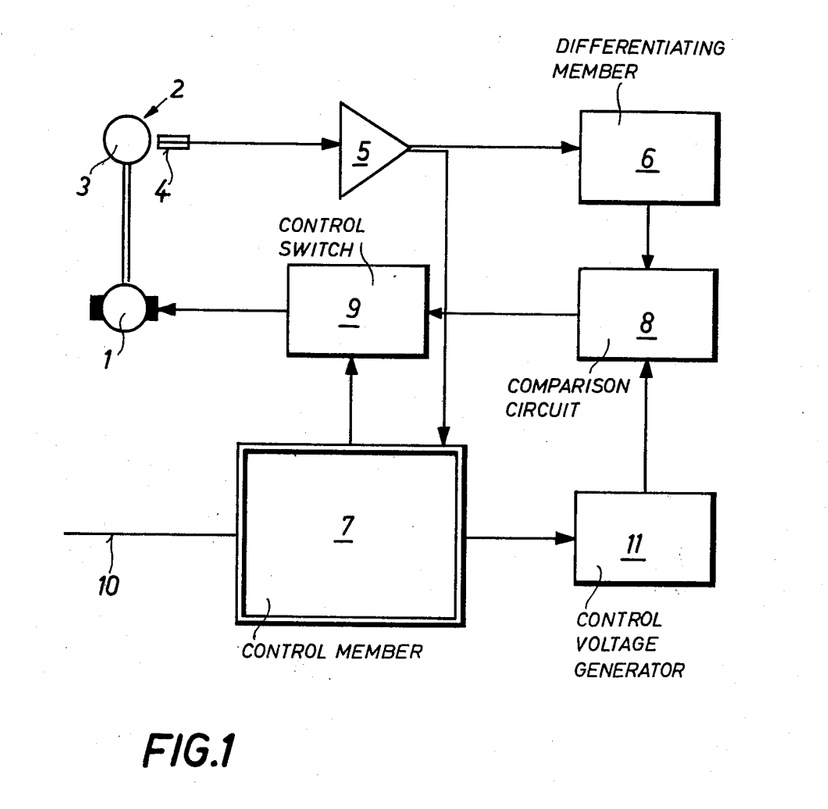
FIG. 1 is a block circuit diagram of one preferred embodiment of a system according to the invention.

FIG. 1 shows a circuit including a d.c. motor 1 which is to be rotated about a defined angle in one of its two possible directions of movement, hereinafter called the forward direction, and to stop precisely in the desired position, under the control of a control member 7 which may be in the form of a microprocessor. Control member 7 receives via an input line 10 a signal indicating the magnitude of the required angular path as well as the associated direction of rotation. The control member 7 transmits instruction 5 for the direction of rotation to a control switch 9 which switches the corresponding current to the windings of the motor 1.

The motor 1 is coupled to a sensor 2 which acts to effectively divide each revolution of the motor into a number of measurable partial angles, hereinafter called steps, and which emits one cycle of a sinusoidal voltage signal to the circuit arrangement for each one of these steps. Such a sensor 2, which includes, for example, an inductive transmitter 3 and a receiver 4, is known in the art and will therefore not be described in detail here. In addition to voltage signals having a sinusoidal shape, voltage signals having a trapezoidal or triangular shape etc. are also suitable for the practice of the present invention.

The voltage furnished by sensor 2, which in this embodiment is sinusoidal, is amplified in a subsequent amplifier circuit 5 and clock pulse signals are derived therefrom in circuit, the repetition rate of the clock pulse signals being determined by the zero passages of the sensor voltage These clock pulse signals are fed to the control member 7 which determines in a known manner from the signal indicating the required angular path and with the aid of the clock pulse signals derived from the sensor voltage, for example by counting downward in a counter set to the number of steps making up the required angular path, when half of the required angular path has been traversed. At that moment, the forward current thus far applied to the windings of motor 1 is shut off by the control switch 9, under control of a signal from the control member 7, and a reverse current is switched through. The motor is thus switched from full acceleration to full breaking.

After reversal of the direction of the current, a comparison of the clock pulse signals derived from the sensor voltage, whose duration is proportional to the angular speed of the motor 1, with an internal clock pulse generated in digital control member 7 allows the digital control member to determine when the motor has reached a fixed, given, lower angular speed value. By cutting in half the required angular path, the magnitude of the braking path has been set to be equal to the acceleration path. However, since the braking path is shortened by mechanical influences, e.g. friction, the motor 1 would oridinarily stop before it reaches the desired position.

To prevent this, the control member 7 causes short pulses of forward current to be switched through in alternation when the speed is reached so as to hold the motor at this speed. These forward current pulses are continued, possibly in alternation with reverse current pulses until comparison of the required position with the actual position of the motor shaft has indicated to the control member 7 that the shaft is removed from the desired position by a fixed, given angle, for example, an angle f corresponding to half a step.

In order to bring the motor as close to the desired position as possible by means of the braking process and to keep the number of current pulses as small as possible, any existing constant coefficients of friction can be considered by applying the reverse current at a fixed level after one half of the required angular path has been traversed.

If the shaft of motor 1 is now offset from the desired position by the fixed, given angle, the control member 7 emits a corresponding signal to generate a control voltage in a circuit 11 whose output is connected to one input of a voltage comparison circuit 8. This control voltage has a value which decreases with time and its waveform corresponds to a path of movement which would bring the shaft of motor 1 into the desired position and into the rest position in an ideal manner. It thus represents the desired curve of movement of the motor shaft.

The second voltage fed to the voltage comparison circuit 8 is furnished by a time differentiating member 6 which differentiates the sinusoidal voltage coming from the sonsor 2 and adds to the differentation result a component proportional to the sensor voltage. The resulting sum signal, which thus constitutes a proportional-derivative (PD) regulation signal, is a function of instantaneous speed and position of the motor shaft.

The control voltage furnished by the circuit 11 is compared in the voltage comparison circuit 8 with the sum voltage coming from the differentiating member 6. In dependence on the polarity of the resulting voltage difference, and in the absence of current direction control signals from control member 7, the control switch 9 is now caused, by the output of the voltage comparison circuit 8 instead of directly by the control member 7, to control switching through of the forward or reverse current to the motor 1. The motor 1 receives a forward current when the sum voltage from member 6 is smaller than the control voltage from circuit 11 and a reverse current when the sum voltage is greater than the control voltage. In this way, the motor 1 is brought into its final position with continuously decreasing deviations from the desired movement curve or control curve.

Figure 2:
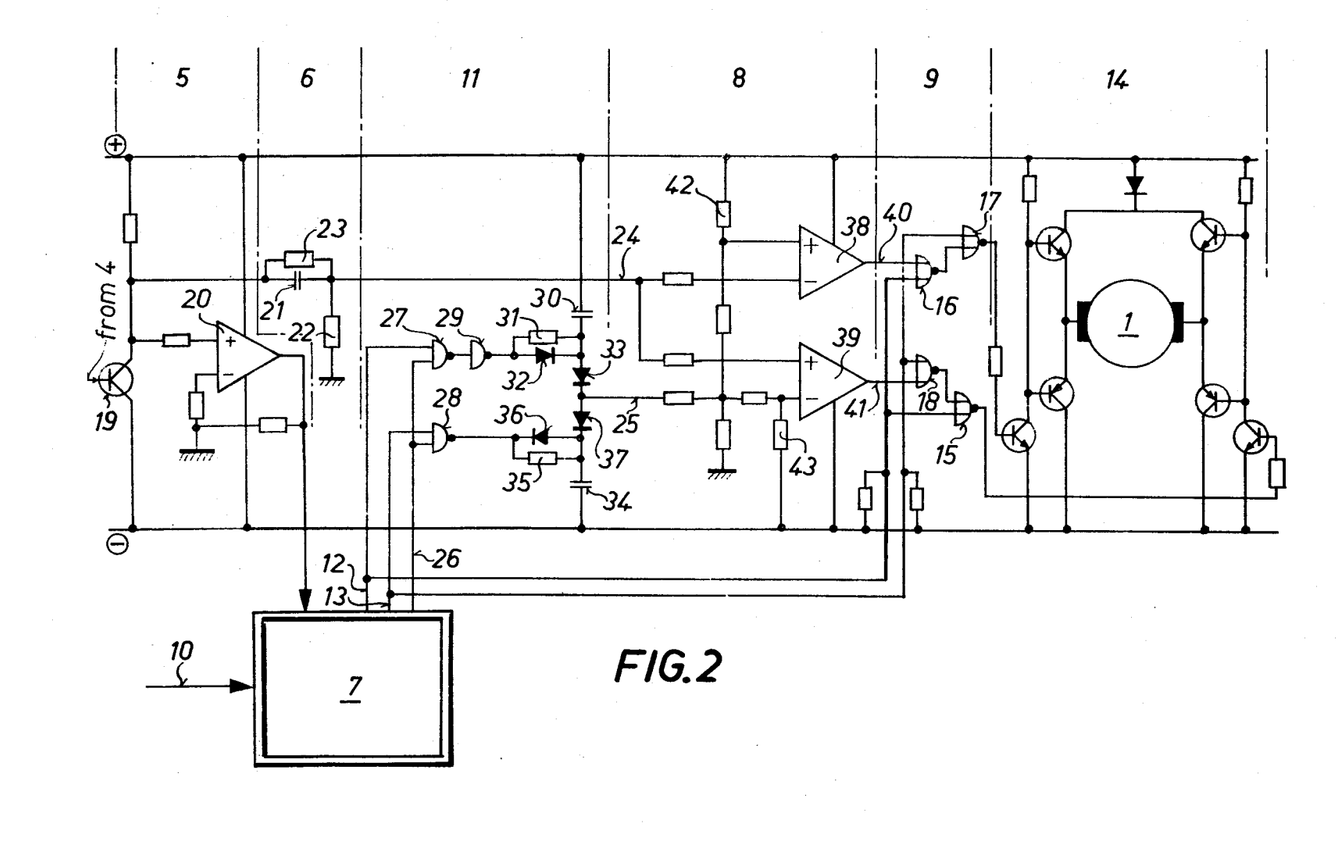
FIG. 2 is a detail circuit diagram of one specific circuit structure for the embodiment of FIG. 1.

FIG. 2 illustrates one specific form of construction for the system of FIG. 1. In the operation of this system, the microprocessor control member 7 emits a control signal to switch 9 through conductor 12 for forward rotation or through conductor 13 for reverse rotation.

The switch 9 causes, via a group of NOR gates 15, 16, 17 and 18, a polarity reversing circuit 14, which is of a known type, to switch operating current through to the motor 1 with the polarity required to produce a rotation force in the ordered direction of rotation.

If, for example, a forward control signal is fed via line 12 of control member 7 to the control switch 9 but no signal is fed via line 13, the resulting output signal from NOR gate 15 prevents any reverse direction on line 41 of voltage comparison circuit 8 from influencing circuit 14 while NOR gate 16 provides an output which assures that the output of NOR gate 17 will cause circuit 14 to switch forward current through to motor 1. Conversely, if a reverse control signal is present in line 13 and no signal is present in line 12, the output signal from NOR gate 17 prevents transmission of any forward rotation signal on line 40 of circuit 8 to circuit 14 and NOR gate 18, acting via NOR gate 15, causes circuit 14 to switch a reverse rotation current to motor 1.

The signal value L on line 12 corresponds to the presence of a forward control signal, the signal value L on line 13 corresponds to the presence of a reverse control signal and the signal value L on line 26 corresponds to the presence of a switch-on signal for circuit 11.

The sensor 2 shown in FIG. 1 which senses the movement of the shaft, generates the above-described path proportional sinusoidal sensor voltage and furnishes it to the input of amplifier circuit 5 from which the signals are amplified by means of a transistor 19 and conducted to the noninverting input of a negative feedback-connected operational amplifier 20 which forms therefrom the clock pulse signal which is dependent on the zero passages, or time derivative maxima, of the sensor voltage and feeds it to the control member 7.

The amplified sensor signal from amplifier 19 also reaches the differentiating member 6, which includes an RC member 21, 22 and a resistor 23 connected in parallel with the capacitor 21. Here, the path proportional sensor voltage is converted to a speed dependent voltage and added to a path proportional component provided by resistor 23. The thus formed sum voltage, with a PD characteristic, is applied to a first input 24 of the voltage comparison circuit 8.

A control voltage is applied to the second input 25 of the voltage comparison circuit 8 if a corresponding switch-on signal is emitted from the control member 7 and is fed via an output 26 to the circuit 11 in order to cause the latter circuit to generate that control voltage. Such a switch-on signal is followed after a very short interval, e.g. 5 ms, by the cutting off of the direction of rotation signal applied to one of conductors 12 or 13.

In the circuit 11 this switch-on signal is fed to two NAND gates 27 and 28 which each have a second input receiving a respective one of the control signals for forward and reverse rotation, respectively, fed from conductor 12 or 13, respectively. If, for example, the forward control signal from conductor 12 is present at the NAND gate 27 and the switch-on signal is applied to output 26, and inverter 29 triggers generation of a first control voltage which is applied via a decoupling diode 33 to the second input 25 of circuit 8. This control voltage will act to bring the motor 1 from the forward direction of rotation to the rest position and is generated in the circuit composed of capacitor 30, resistor 31 and diode 32. Conversely, a reverse control signal applied to NAND gate 28 together with the switch-on signal from output 26 triggers generation of a second control voltage which will act to bring the motor 1 from the reverse direction of rotation into the rest position. The second control voltage is generated in the circuit composed of capacitor 34, resistor 35 and diode 36 and is fed via a decoupling diode 37 to the second input 25 of the voltage comparison circuit 8.

In the voltage comparison circuit 8 a comparison is made, with the aid of two operational amplifiers 38 and 39, between the sum voltage from differentiating member 6 present on line 24 and the control voltage present on line 25 and, in dependence on the voltage difference, a control signal is transmitted to switch 9 either from output 40 of amplifier 38, for switching through a forward current, or from output 41 of amplifier 39, for switching through a reverse current. Since shortly after application of the switch-on signal from output 26, the control member 7 has switched off the direction of rotation signal present in one of conductors 12 or 13, and no signal is being provided by the other one of those conductors, the control switch 9 is controlled exclusively by the output signals of the voltage comparison circuit 8.

Although the motor shaft has been brought into the rest position with continuously decreasing deviations from the control voltage curve, there will remain an oscillatory movement, albeit very weak, about the desired position produced, inter alia, by noise from the amplifying elements. This oscillation can no longer be discerned by a change in the position of the motor shaft 1, but it does become evident as an annoying buzzing noise. To prevent this, resistors 42 and 43 in circuit 8 provide a setting tolerance g in the voltage comparison circuit 8 within which regulation is surpressed. If the motor shaft enters this region, which is, for example, ±0.02 mm from the target position, no signals are emitted any longer from the outputs 40 and 41 of the voltage comparison circuit 8 to the control switch 9 so that no current is switched through either and the motor remains at rest. The ±0.02 mm tolerance value corresponds to an angular value of ±0.03°.

A detailed description of the polarity reversal circuit 14 is believed to be unnecessary since it conforms to the state of the art. The resistances in the circuit arrangement which are not individually identified serve in a known manner to match voltages or levels, respectively.

The following table shows the control signals which are given by the control member 7 to the two output lines 12 and 13 for the various operational states of the motor.

| Control signal in Line | | |
|---|---|---|
| 12 | 13 | Operating State |
| L | 0 | Motor receives forward current |
| 0 | L | Motor receives reverse current |
| 0 | 0 | Control is switched on by control signal in line 26 |

Since in addition to motor rotation over a plurality of sensor divisions, the procedure for which has been described in particular in connection with FIG. 1, movement through individual steps of only one sensor division, or step, at a time is also to be possible with the basically identical control method, the dimensioning of the control curve, i.e. of the components for generating the control voltage, is based on the angular speed which the motor 1 can reach when only a single step is traversed.

Advisably the motor 1 receives current in the desired direction of rotation until one half of a step or only a bit more than one-half of a step, has been traversed, for example the amount of time required to switch on the control curve, and is thus accelerated, whereupon the current is switched off and the movement to the desired rest position along the control curve is controlled in the above-described manner by the voltage comparison circuit 8. This then fixes the required starting speed at which the control curve can be effectively employed. With rotation of the motor over several steps, the speed e must then, after braking, also have the magnitude of the starting speed attainable with only a single step.

With motor rotation over several steps and braking after traversal of about one-half the path, it may happen that, under greatly fluctuating friction conditions, the speed e at times is attained considerably before the desired position is reached. In the above-described procedure, travel over the remaining path until the latter position is reached would then take an unduly long time. To overcome this, the control member 7 may be designed so that the current opposing the present direction of rotation is interrupted already at a speed higher than e, the motor is held at this high speed by brief forward and reverse pulses until a fixed, given distance from the desired position has been reached, then the oppositely directed current is reapplied until the motor 1 has reached speed e, and finally the control voltage is brought into effect when the motor position is one-half step ahead of the desired position in the manner described above. Such a division, which of course can also cover several speed stages, makes it possible to reach the desired position more quickly.

In this case, the control member likewise detects the angular speed of the motor by comparison of the clock pulse derived from the sensor voltage with the clock pulse inside the control member and can thus transmit corresponding control signals to the circuit arrangement in dependence on the given speed thresholds. Likewise, corresponding control signals can be derived by downward counting of a counter, which is set for the number of steps to be performed, from defined counter states which correspond to the remaining displacement path of the motor shaft until it reaches the desired position.

Of course, parts of the circuit arrangement shown in FIG. 2 can also be eliminated by having the microprocessor constituting the control member 7 take over their function as well.

Figure 3:
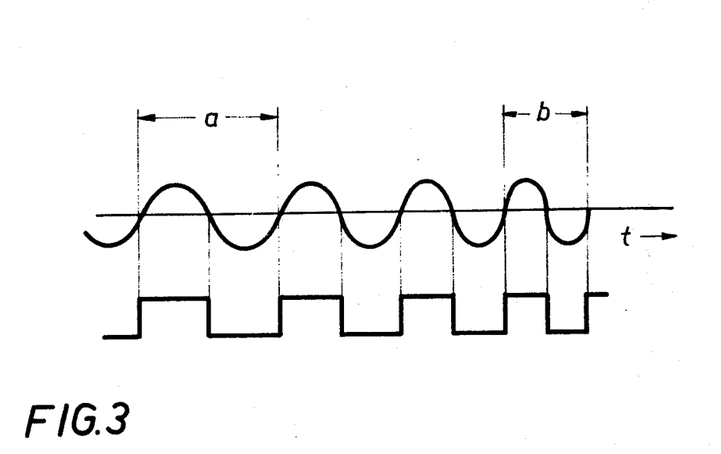
FIGS. 3 and 4 are signal vs. time waveforms illustrating the operation of circuits according to the invention.

The upper curve of FIG. 3 shows the waveform of voltage vs. time of the path proportional sine signal furnished by the sensor 2. The cycle in the left-hand region, having a period "a", corresponds to one step of the motor, i.e. one sensor division, as does the right-hand cycle having a period "b". However, the cycle having a period "a" represents a lower motor speed than does the cycle of period "b".

The lower curve of FIG. 3 shows the clock pulse signal derived by amplifier 20 from the sensor voltage and fed to the control member 7 where it is required in order to control the movement of the motor. It can be seen that the periods of the clock pulses and repetition rate if the clock pulse signal correspond to the timing of the zero passages of the sensor voltage.

Figure 4:
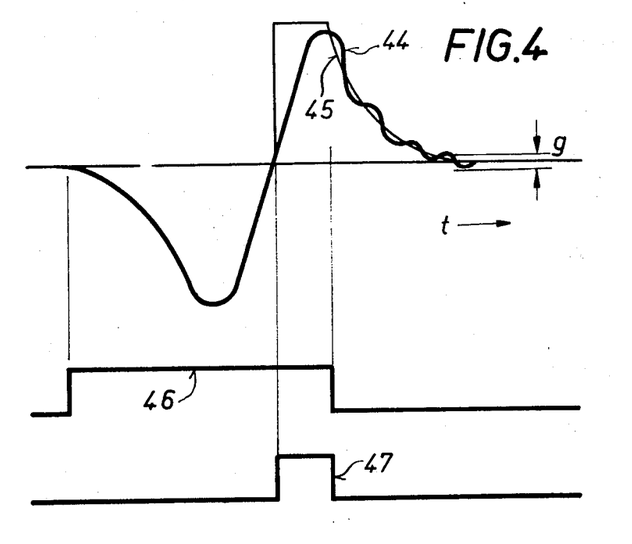

FIG. 4 illustrates the control operation when only a single step is traversed. Waveform 46 shows the switch-on signal for the motor current, e.g. in the forward direction, delivered by control member 7 through line 12. Waveform 47 shows the switch-on signal furnished by control member 7 at output 26. When a switch-on signal pulse is terminated, the signal pulse 46 in line 12 is also terminated.

The waveform 44 represents the sum voltage coming from the proportional-differentiating member 6, and supplied to circuit 8 via line 24, while waveform 45 represents the control voltage supplied to line 25 of circuit 8.

After termination of the pulses 46 and 47, the output voltages from comparison circuit 8 then cause the forward or reverse current to be switched through corresponding to the difference between the two voltages 44 and 45, so that the motor shaft undergoes further movement as defined by the right-hand portion of waveform 44, generally along the control curve 45 into the desired position. This movement includes a sequence of acceleration phases, represented by steep line curve segments and deceleration phases, represented by shallow line curve segments. The window "g" represents the setting tolerance, determined by resistors 42, 43 of FIG. 2, within which the control is switched off.

Figure 5:
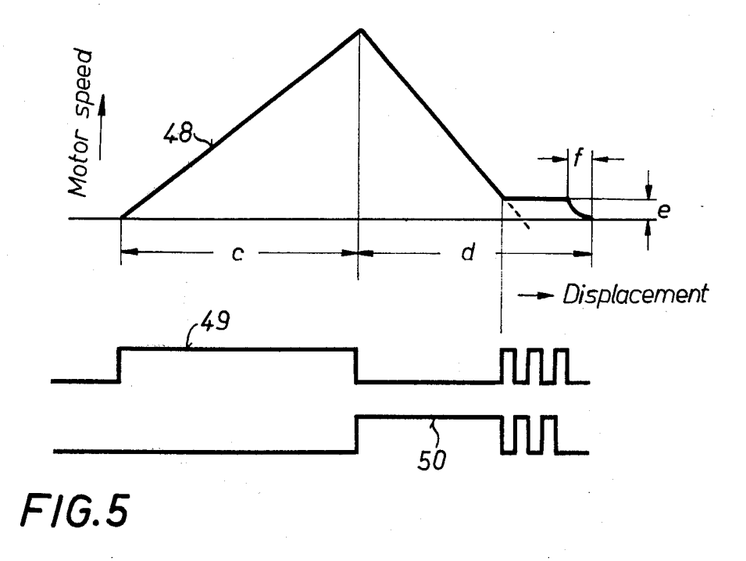
FIGS. 5 and 6 are performance curves further illustrating the invention.

In FIG. 5, waveform 48 shows the speed of the motor 1 as a function of displacement when the motor shaft rotates through several steps. Here periods c and d each represent one-half of the angular path of travel of the motor shaft. Pulse waveform 49 shows the application of forward current to the motor, while waveform 50 shows the application of reverse current thereto. It can be seen that the acceleration phase is switched off after the first half, c, of the path and the braking phase is switched on by applying current in the reverse direction. After the lower angular speed e has been reached, the braking phase is switched off and short current pulses are applied alternatingly in the forward and reverse direction to hold the motor at that speed. When a distance f from the desired position has been reached, which corresponds to one-half of a sensor step, the control voltage is switched on as described with reference to FIG. 4.

To assure generation of the proper control voltage, the last current pulse applied to motor 1 must produce rotation in the forward direction.

Figure 6:
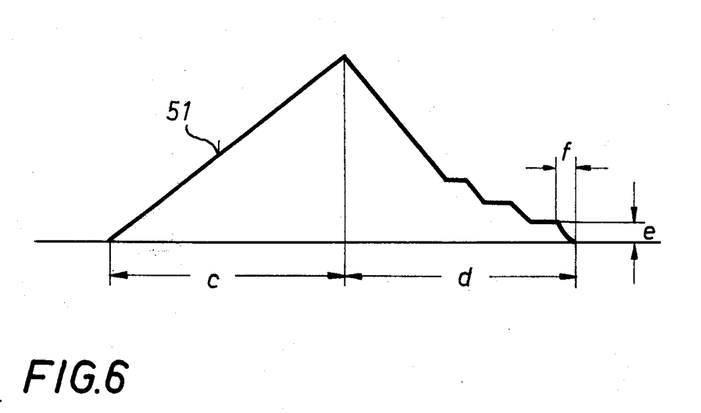

FIG. 6 shows a curve 51, corresponding to the curve 48 of FIG. 5 and representing a mode of operation in which the motor 1 is braked in stages to the speed e. The control voltage here again is switched on by the control member 7 when the shaft is at a distance f equal to one-half step ahead of the desired target position.

Figure 7:
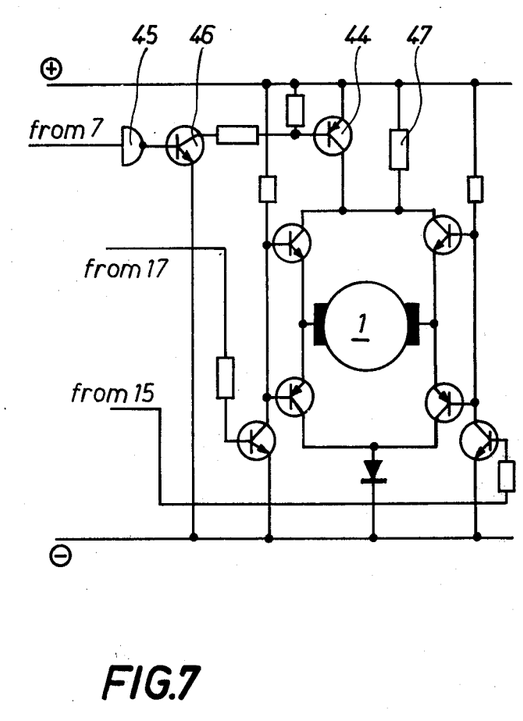
FIG. 7 is a detail circuit diagram of a modified version of the circuit of FIG. 2.

In order to reliably eliminate a possible oscillation around the desired position, the circuit measure shown in FIG. 7 can additionally be applied. This permits, upon a signal from control member 7, reduction of the amplitude of the operating current which is switched through to the motor 1 from the polarity reversal circuit 14 of FIG. 2. During the running and control phase of motor 1, the full operating current is applied through the conducting pnp transistor 44 to the polarity reversal circuit so that the forward and reverse current supply to the motor windings is effected with full operating current.

If the control voltage is caused to act in the above-described manner, by the application of the switch-on signal at output 26 (FIG. 2) and the motor shaft is brought into the desired target position along the control voltage curve, the motor will enter, after a certain period of time, the range of the setting tolerance, i.e., window g of FIG. 4, within which the regulation becomes ineffective due to the influence of voltage divider 42,43.

Switching on of the current regulation in control member 7 occurs after a fixed time period which is selected so that the setting of motor 1 at the end of that period is in the range of the setting tolerance g. The control member 7 then applies a signal to the inverter 45 with the result that the pnp transistor 44 is blocked by the output signal from an npn transistor 46. A reduced voltage is now applied via a resistor 47 to the polarity reversal circuit, the magnitude of the voltage depending on the size of resistor 47.

If the motor setting 1 now swings outside of the setting tolerance range g due to its mass inertia or due to the mass inertia of a part driven by it, it is brought back into the setting tolerance range g by means of the reduced operating current.

It is also conceivable that a certain measure of elasticity, or play, in the chain of components occurs between motor 1 and its driven member. This may have the result that, as a result of the reduced current, the motor shaft position is brought back into the setting tolerance range from outside the limits thereof, but that then, since the current supply in the setting tolerance range is suppressed, the spring effect of its elasticity swings it back out of that range. To suppress the resulting pendulum action about the limits of the setting tolerance range, the control member 7 cancels the limitation of the motor operating current by temporary changes in the signal at the inverter 45 at fixed, given intervals. The motor 1, if its shaft setting should go beyond the limits of the setting tolerance range g, then receives a short nudge by a pulse at full current so that it is pushed away from the borderline area and well within the setting tolerance range.

Figure 8:
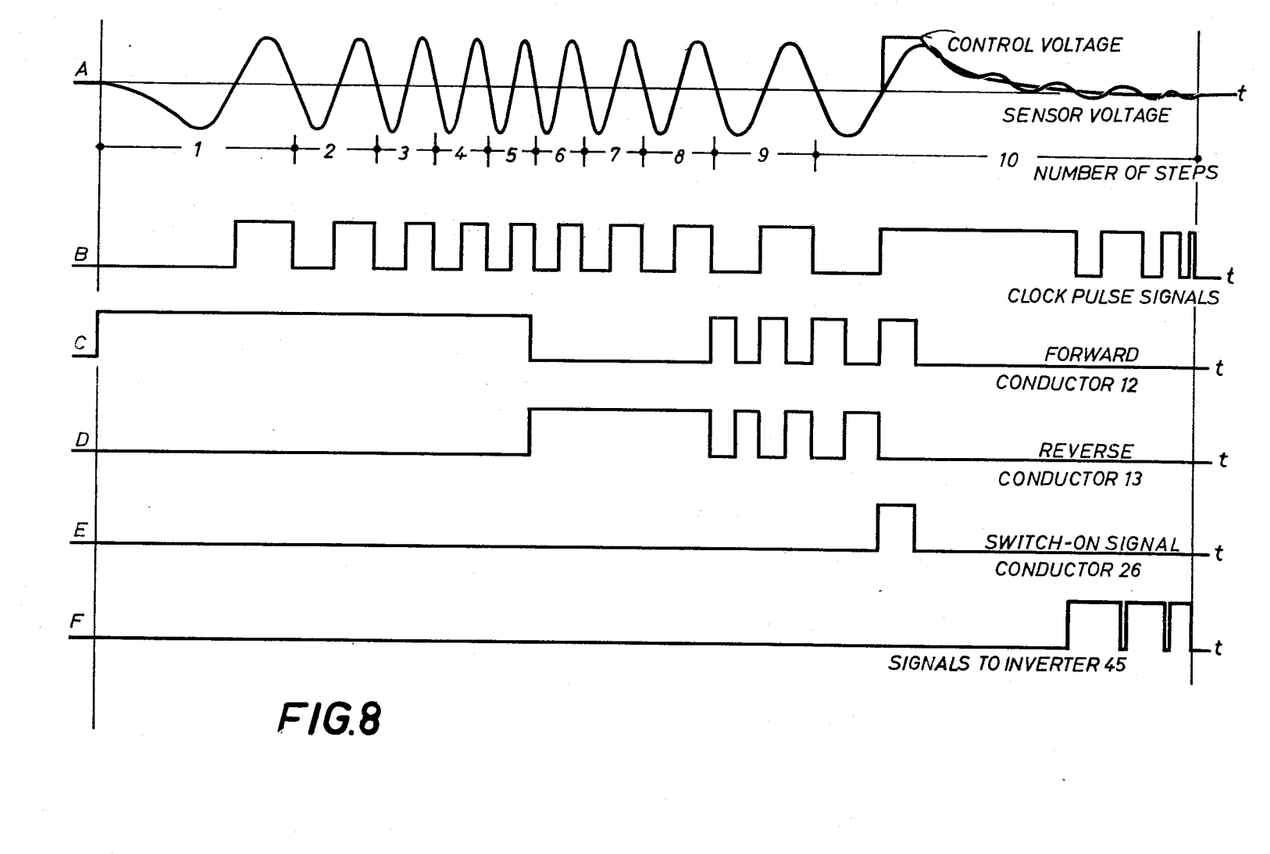
FIG. 8 illustrates pulse waveform diagrams of the signals at the inputs and outputs of the control member of FIG. 2.

FIG. 7 shows pulse waveform diagrams illustrating a sequence of the signals at the inputs and outputs of the microprocessor control member 7 of FIG. 2. It is assumed that the shaft of motor 1 has to rotate to a target position at a distance of 10 steps from the start position. The number of steps and the order "forward" for direction of rotation is given to the control member 7 via line 10.

Microprocessor control member 7 emits control signals to switch 9 through conductor 12 for forward rotation as illustrated in diagram C of FIG. 8. Diagram A represents the sinusoidal voltage signals which are emitted by receiver 4 of sensor 2. For each one of the 10 steps one cycle of the sinusoidal signal is emitted as indicated underneath diagram A. It is to be seen that the duration of the sinusoidal sensor voltage is proportional to the angular speed of the shaft of motor 1.

Diagram B shows the clock pulse signals which are generated from the sinusoidal signals of diagram A by the operational amplifier 20 and fed to the control member 7. By counting these clock pulse signals the control member 7 determines the progress of shaft rotation.

The forward control signal is applied to the switch 9 until 5 of the required 10 steps are executed. The motor shaft is accelerated during this time period. After the fifth step being executed the control member 7 stops emitting forward control signals through conductor 12 and emits reverse control signals through conductor 13 instead as shown in diagram D. The motor is thus switched from acceleration to braking.

The reverse control signals are applied to the switch 9 until 8 of the required 10 steps are completed. Then forward and reverse signals of short duration are applied alternately to the switch 9 via conductors 12 and 13 respectively until the shaft of motor 1 is one-half step apart from the target position which corresponds to one-half of the last sensor signal in diagram A. Now the control member 7 emits the switch-on signal for the control voltage through conductor 26 as illustrated in diagram E.

The waveform of the control voltage which brings the motor shaft into the target position in an ideal manner can be defined as a waveform which approaches the target position in a smoothly decreasing manner. For example an ideal curve is formed by the curve of an exponential function.

The signals in conductors 12, 13 and 26 are then terminated. The control switch 9 is now caused by the output of the voltage comparison circuit 8 to control switching through of the forward or reverse current to the motor 1. The motor 1 is brought into its final position with continuously decreasing deviations from the control curve as shown in the righthand part of diagram A.

Clock pulse signals which are generated by the operational amplifier 20 and fed to the control member 7 after the control voltage (righthand part of diagram B) has been switched on are ignored by the control member 7.

Diagram F shows the signals which are emitted from control member 7 and applied to the inverter 45 of FIG. 7, when the polarity reversal circuit of FIG. 7 is employed instead of the circuit 14 of FIG. 2. Application of these signals to the inverter 45 causes the circuit to reduce the operating current which is applied to the motor 1. The signals are interrupted twice in order to temporary cancel the limitation of the motor operating current and apply a pulse at full current to the motor 1.

It will be understood that the above description of the present invention is susceptible to various modifications, changes and adaptations, and the same are intended to be comprehended within the meaning and range of equivalents of the appended claims.

What is claimed is:

1. In a method for positioning the shaft of a motor which can be subject to a rotation force in either direction of rotation by application of drive current of a respective polarity, in order to bring the shaft to a target angular position by the action of a digital control and a position sensor associated with the motor shaft for emitting a displacement step signal in response to each movement of the shaft through an incremental angle constituting a given fraction of one cycle of shaft rotation, which method includes comprising a signal derived from such step signal with a control signal and utilizing the result of the comparison to control the motor drive current, the improvement wherein: the displacement step signal produced by said sensor in response to each incremental angle of shaft movement is a signal cycle of sinus-like waveform; said method comprises deriving from the displacement step signal a shaft movement signal having a value represented by the sum of a component proportional to the displacement step signal and a component proportional to the time derivative thereof for the last half of the associated step signal cycle, and, after the shaft has reached a predetermined angular speed and at the moment when the shaft reaches a position spaced from the target position by one-half of the incremental angle, causing the control signal to have a value which decreases with time; said step of comparing comprises comparing the shaft movement signal with the control signal; and said step of utilizing the comparison result comprises varying the polarity of motor drive current in dependence on the polarity of the comparison result.

2. Method as defined in claim 1 further comprising: applying to the motor a drive current having a polarity opposing the direction of motor movement when the speed of the motor is higher than the predetermined angular speed and until the predetermined angular speed is at least approximately reached; and then maintaining the motor speed at the predetermined angular speed until the distance between the actual and target shaft positions decreases to a value corresponding to one-half of the incremental angle by controlling the drive current.

3. Method as defined in claim 2 wherein said step of applying a drive current of opposing polarity includes interrupting such current at least once before the predetermined angular speed is reached.

4. Method as defined in claim 3 wherein said step of applying a drive current of opposing polarity is carried out by applying such current in stages, and said step of maintaining is performed until a given distance between the actual and target shaft positions has been reached.

5. Method as defined in claim 1 further comprising terminating said step of varying when the distance between the actual and target shaft positions is within a selected tolerance range.

6. Method as defined in claim 1, 2, 3, 4 or 5 wherein the predetermined angular speed of the motor shaft is given a value equal to the speed reached by the shaft when accelerated from rest by a drive current through an angle equal to one-half of the incremental angle.

7. A circuit for controlling the position of the shaft of a motor which can be subject to a rotation force in either direction of rotation by application of drive current of a respective polarity, by bringing the shaft to a target angular, comprising: a position sensor responsive to rotation of the motor shaft for producing a displacement step signal in the form of a cycle of sinus-like waveform in response to each movement of the shaft through an incremental angle constituting a given fraction of one cycle of shaft rotation; control means connected to receive the signal produced by said sensor for monitoring the path traversed by, and the angular speed of, the motor shaft; a control switch connected between the motor and said control means to operate under control of said control means for controlling the delivery of drive current to the motor; a signal shaping member connected to said sensor for providing a shaft movement signal formed by the sum of a component proportional to the displacement step signal and a component proportional to the time derivative thereof; a control signal generator connected to said control means for providing, in response to signals from said control means, a control signal having a value which decreases with time; comparison means connected to receive the shaft movement signal and the control signal for producing a comparison signal dependent on the polarity of the difference between the two signals which it receives; and means for initiating the control signal and supplying the resulting comparison signal from said comparison means to said control switch for controlling the polarity of drive current applied to the motor as a function of the comparison signal when the motor shaft reaches a predetermined angular speed and an angular position within the incremental angle from the target position.

8. An arrangement as defined in claim 7 further comprising clock pulse generating means connected between said position sensor and said control means for deriving a train of clock pulses from the displacement step signal with a clock pulse repetition rate determined by the zero passages of the displacement step signal and for supplying those clock pulses to said control means.

9. An arrangement as defined in claim 7 wherein said signal shaping member comprises an RC differentiating member connected for differentiating the displacement step signal furnished by said sensor, and a resistor connected in parallel with the capacitor of said RC member for adding a signal component proportional to the step signal to the differentiation signal produced by said RC member.

10. An arrangement as defined in claim 7 wherein said control signal generator comprises: two signal generating units each arranged to produce a control signal for a respective direction of motor rotation and each composed of a parallel connection of a resistor and a diode; means connecting one end of said parallel connection of one said unit to a source of positive voltage potential and one end of said parallel connection of the other said unit to a source of negative voltage potential; gating circuit means connecting each said parallel connection to outputs of said control means providing signals indicative of the direction of motor rotation; and means including decoupling diodes connecting said circuit units to the control signal input of said comparison means.

11. An arrangement as defined in claim 7 wherein: said comparison means comprises two operational amplifiers each arranged to produce a comparison signal for a respective direction of motor rotation, with the noninverting input of one said amplifier and the inverting input of the other said amplifier being connected to receive the shaft movement signal, and the other input of each said amplifier being connected to receive the control signal; and said means supplying the comparison signal are connected for supplying the signals at the outputs of both of said amplifiers to said control switch.

12. An arrangement as defined in claim 11 further comprising two regulating resistors each connected between the other input of a respective one of said operational amplifiers and a respective one of a source of a negative voltage potential and a source of a positive voltage potential for suppressing the production of a comparison signal when the shaft movement signal is within a given tolerance range of its zero value.

13. An arrangement as defined in claim 7 wherein said control means comprise a digital microprocessor.

14. An arrangement as defined in claim 7 further comprising a drive current delivery circuit connected for delivering drive current of selected polarity to the motor in response to signals provided by said control switch.

15. An arrangement as defined in claim 14 wherein said drive current delivery circuit comprises: a power source; a transistor having its emitter-collector path connected to deliver drive current from said power source to the motor; and a current supply resistor connected in parallel with said transistor and having a higher resistance than the collector-emitter path of said transistor when in the conducting state; and means connected to said transistor for maintaining it normally conducting and for placing said transistor in its blocking state, so that current is delivered to the motor only via said resistor, at a fixed time after initiation of the control signal.

16. An arrangement as defined in claim 15 wherein the fixed time occurs after the motor shaft has reached a position within a fixed tolerance range bounding the target position.

17. An arrangement as defined in claim 15 or 16 wherein said control means are arranged to render said transistor conductive for brief periods at selected time intervals.

* * * * *